US008307284B2

(12) United States Patent
Ross et al.

(10) Patent No.: US 8,307,284 B2
(45) Date of Patent: Nov. 6, 2012

(54) METHOD AND SYSTEM FOR AUTOMATED CONTROL OF AUDIO AND VIDEO SOURCES AND A FINAL COMPOSITE OUTPUT THEREOF THROUGH A VIDEO SWITCHER

(75) Inventors: David Allan Ross, Nepean (CA); Jeffrey Derek Moore, Iroquois (CA); Troy David English, Ottawa (CA); Gerald D. Kuch, Ottawa (CA); Charles Allan Pepper, Ottawa (CA); Christopher M. Rude, Vancouver (CA); Jonathan Douglas Laurie Pile, Kanata (CA); Alun John Fryer, Ontario (CA)

(73) Assignee: Ross Video Limited, Iroquois, Ontario (CA)

( * ) Notice: Subject to any disclaimer, the term of this patent is extended or adjusted under 35 U.S.C. 154(b) by 1083 days.

(21) Appl. No.: 11/087,629

(22) Filed: Mar. 24, 2005
(Under 37 CFR 1.47)

(65) Prior Publication Data
US 2005/0223106 A1 Oct. 6, 2005

Related U.S. Application Data

(60) Provisional application No. 60/556,505, filed on Mar. 26, 2004.

(51) Int. Cl.
*G06F 3/00* (2006.01)
*H04N 7/173* (2011.01)

(52) U.S. Cl. ........ 715/716; 715/719; 715/723; 715/731; 715/733; 715/751; 725/105

(58) Field of Classification Search .................. 725/105; 715/105
See application file for complete search history.

(56) References Cited

U.S. PATENT DOCUMENTS

| 5,307,456 | A | * | 4/1994 | MacKay | 715/782 |
|---|---|---|---|---|---|
| 5,450,140 | A | * | 9/1995 | Washino | 348/722 |
| 6,141,007 | A | * | 10/2000 | Lebling et al. | 715/792 |
| 6,208,376 | B1 | * | 3/2001 | Tanaka et al. | 348/153 |
| 6,452,612 | B1 | | 9/2002 | Holtz et al. | |
| 6,588,018 | B1 | * | 7/2003 | James et al. | 725/146 |
| 6,725,268 | B1 | * | 4/2004 | Jackel et al. | 709/227 |
| 6,789,109 | B2 | * | 9/2004 | Samra et al. | 709/220 |
| 6,792,469 | B1 | * | 9/2004 | Callahan et al. | 709/231 |
| 6,892,388 | B1 | * | 5/2005 | Catanoso | 725/105 |
| 6,909,874 | B2 | * | 6/2005 | Holtz et al. | 434/362 |

(Continued)

OTHER PUBLICATIONS iNEWS, Jun. 2003,Avid, http://web.archive.org/web/20030609060230/avid.com/products/inews/features.shtml.*

(Continued)

*Primary Examiner* — Matt Kim
*Assistant Examiner* — Yongjia Pan
(74) *Attorney, Agent, or Firm* — Nixon Peabody LLP; Jeffrey L. Costellia

(57) ABSTRACT

An audio and video production system and method, including a video production control switcher; and one or more computers connected through a network and configured for controlling the video production control switcher. The system is further configured for at least one of defining looks, including shot templates, that correspond to particular settings on the production control switcher or settings of parts of the production control switcher; defining sequences of the looks or assigning individual looks to control elements on a computer of the computers; transmitting the looks across the network; and translating of a single look into one or more standard editor commands, and transmitting the commands to the production control switcher.

90 Claims, 3 Drawing Sheets

U.S. PATENT DOCUMENTS

| | | | |
|---|---|---|---|
| 7,024,677 B1* | 4/2006 | Snyder et al. | 725/86 |
| 7,207,057 B1* | 4/2007 | Rowe | 725/144 |
| 7,526,568 B1* | 4/2009 | Swanton et al. | 709/239 |
| 2002/0120564 A1* | 8/2002 | Strietzel | 705/40 |
| 2003/0122862 A1* | 7/2003 | Takaku et al. | 345/723 |
| 2004/0027368 A1* | 2/2004 | Snyder et al. | 345/716 |
| 2005/0030432 A1* | 2/2005 | Ross et al. | 348/705 |
| 2005/0210392 A1* | 9/2005 | Koide et al. | 715/751 |

OTHER PUBLICATIONS

MOS Project Description, Mar. 24, 2003, http://web.archive.org/web/20030324055139/http://www.mosprotocol.com/MOS+Files/The+MOS+Project.doc.*

Media Object Server (MOS) Protocol v2.6, Apr. 14, 2003, http://web.archive.org/web/20030414044559/http://www.mosprotocol.com/MOS+Files/mosv26.htm.*

* cited by examiner

METHOD AND SYSTEM FOR AUTOMATED CONTROL OF AUDIO AND VIDEO SOURCES AND A FINAL COMPOSITE OUTPUT THEREOF THROUGH A VIDEO SWITCHER

CROSS REFERENCE TO RELATED DOCUMENTS

The present invention claims benefit of priority to U.S. Provisional Patent Application Ser. No. 60/556,505 of ROSS et al., entitled "METHOD, SYSTEM AND DEVICE FOR AUTOMATED CONTROL OF AUDIO AND VIDEO SOURCES AND A FINAL COMPOSITE OUTPUT THEREOF THROUGH A VIDEO SWITCHER," filed Mar. 26, 2004, the entire disclosure of which is hereby incorporated by reference herein.

BACKGROUND

1. Field of the Invention

The exemplary embodiments of the present invention, also referred to as the "OverDrive" system, relate to exemplary equipment (e.g., hardware and/or software) and processes that are used to automatically create real-time streaming video outputs or combined video and audio outputs, for example, for the broadcast industry. The exemplary embodiments include a highly reliable method that can automatically control various devices to ultimately produce a finished video program and program audio.

2. Discussion of the Background

Over the years, video and audio equipment has been developed. For example, U.S. Pat. No. 6,452,612 is directed to a method for a real time video production system. U.S. Pat. No. 5,450,140 is directed to a method of using a personal computer as a base for a video production system. However, such video and audio equipment, especially professional video and audio equipment, has become very complicated to operate, wherein proper operation of such equipment often takes years of training, and users of the video equipment often cannot operate the audio equipment and vice versa.

SUMMARY OF THE INVENTION

Therefore, there is a need for a method and system that addresses the above and other problems with conventional systems and methods. Accordingly, in exemplary aspects of the present invention, an audio and video production system and method are provided, including a video production control switcher; and one or more computers connected through a network and configured for controlling the video production control switcher. The system is further configured for at least one of defining looks, including shot templates, that correspond to particular settings on the production control switcher or settings of parts of the production control switcher; defining sequences of the looks or assigning individual looks to control elements on a computer of the computers; transmitting the looks across the network; and translating of a single look into one or more standard editor commands, and transmitting the commands to the production control switcher.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 3:
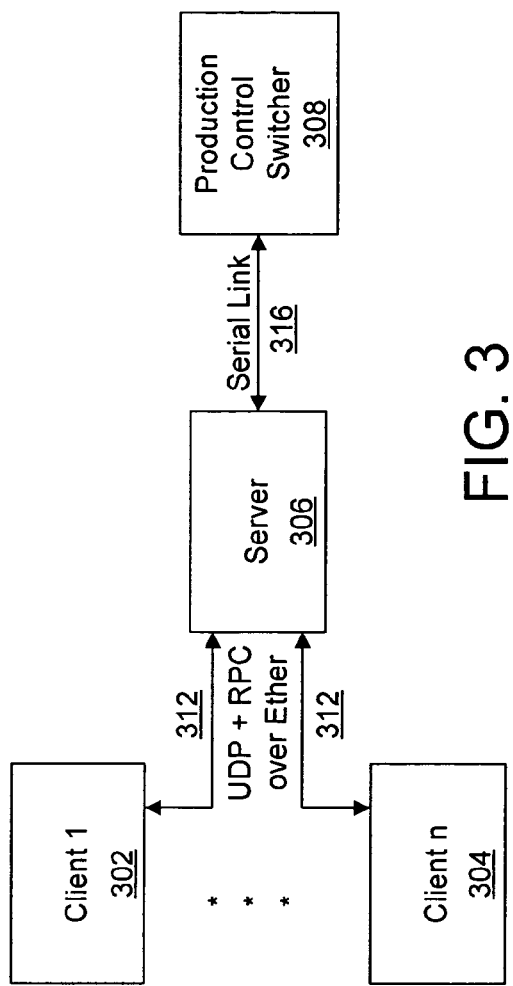
FIG. 3 illustrates a further exemplary network configuration of the present invention, including networked computers, running the production control software, connected to a server, which is in turn connected to a production switcher over a serial connection.

A method and system for automatically creating real-time streaming video outputs or combined video and audio outputs, for example, for the broadcast industry are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

Automated Control of Audio/Video Devices Through a Video Switcher

In the production of a television show many devices in the studio must interact to produce the finished audio/video program output (see Table 1 for a listing of such exemplary devices). In most audio/video production control rooms, the video switcher is the central hub. The video switcher is designed to control and, especially, coordinate, in real time or near real time, some of the many external devices used in a production.

TABLE 1

Listing of possible devices that can be found in a production control room and that may contribute to the creation of the final audio/video program output.
Production Control Room Devices Video switcher/mixers
Servers (VDCP/Louth Support)
DDRs (Betacam Protocol)
VTRs (Betacam Protocol)

TABLE 1-continued

Listing of possible devices that can be found in a production control room and that may contribute to the creation of the final audio/video program output.
Production Control Room Devices Audio Servers
Routers
DVEs (Digital Video Effect)
Audio Mixers
Robotic Cameras
Still Stores
News Room Systems
Serial tally devices
PIP II protocol devices
GPI control devices
Newswire services
Lighting
Non-Linear Editing equipment
Master Control Switchers
Teleprompter
Character Generator
Chroma Keyers
Microphones
Intercoms
DVcams Recorders Many of the above devices employ what is referred generically to as "clips." A clip is the extra piece of information that these devices need to provide the correct outputs. Examples of clips and devices include:
  Video Servers: The clip is the name of the video server file to play.
  Robotic Cameras: The clip is the location of the camera.
  VCR: The clip is the location of the tape in the VCR.

Reliability

A video switcher is recognized to be the single point of failure in the control room and, as such, video switchers are designed to be robust and recover quickly on the rare occasions that they do fail. Recovery times are typically less than the time of a commercial break.

The exemplary embodiments (referred to as the OverDrive system) take full advantage of these aspects of a video switcher. The exemplary embodiments provide automation of the control room by controlling the central hub, the video switcher, which in turn can control much of the control room equipment.

The advantages of the exemplary embodiments include:
  The automation system can be easily integrated into an existing control room.
  The automation system can run on a less robust platform (hence lower cost) while still allowing for a highly robust control room since the video switcher can be used manually in the event that the automation system fails.
  The automation system can focus on controlling one device (e.g., the video switcher, and the like) rather than trying to control many different devices itself.

Shots

The broadcast signals sent out from a video switcher are called Program Video and Program Audio. During a broadcast the Program Video can be a composite of several video signals at once. Separately, or together, during a broadcast, the Program Audio can be a composite of several audio signals at once. A specific combination of Program Video and Program Audio employed for a broadcast can be referred to as a shot.

During a broadcast all of the video signals go through a video production system, which is responsible for selecting inputs and mixing layers of video together and providing the final Program Video. This video production system can be referred to as a video switcher.

During a broadcast all of the audio goes through an audio mixing system, which is responsible for selecting audio inputs and mixing the audio signals together providing the final Program Audio. This audio mixing system can be referred to as an audio mixer.

Video switchers are used to assemble multiple video sources into a shot, which is broadcast live as part of a show. The video switcher can, but doesn't always, control other video devices (e.g., the devices from table 1). The video switcher can also be interfaced with an audio board and can provide automatic switching of audio. Similarly, Audio mixers are used to assemble multiple audio sources into a shot, which is broadcast live as part of the show. The audio mixer can be, but isn't always, controlled by the video switcher.

A number of computer applications can be used to create a description of the sequence of shots employed for a broadcast, called rundowns, which can be printed and given to the video switcher operator, and audio mixer operator, if present. Typically, information about which devices are to be used, and which clip is to be loaded on each device is included in the rundown information, as well as directions as to the on-screen location of keys, other switcher settings, audio setting, and the like. It is up to the switcher operator(s) to create this picture, select the correct device(s) and cue the correct clip(s) using controls on the video switcher itself. This setup takes place in a very time-critical environment, when the previous shot ends, the next shot must be ready to go to air to create a seamless broadcast with no gaps. Also, due to the changing nature of live video broadcasts, shots and rundowns are frequently changed during production of a show, resulting in the need for frequent updates and communication between production staff and the switcher operator to prevent the wrong shot from being taken to air.

Program Video and MLE's

The Program Video is made up of one background and a number of 'keys'. A key is simply one piece of video overlayed onto another. Several keys may be overlayed on top of one background and it is commonly understood to talk about how many keys are on air.

Video streams are sub defined into levels called Multi-Level-Effects (MLE's). Each MLE can have several keys. MLE's can be used as the input to other MLE's thus allowing more keying layers. Thus, the Program Output is the combined layering of multiple MLE's with multiple keys at once.

Every layer of video in a video production switcher is typically referred to as a bus. It is understood in the art to talk about the key 2 bus or the key 1 bus which means the video in key 2 and the video in key 1.

Shot Templates

At any given point in the broadcast a description can be given of what is currently on air. In an exemplary embodiment, a shot template can include the following pieces of information:
  The background video.
  The keys overlayed on the background video.
  The audio sources that can be heard and the volume of each audio channel.

Any devices that are used as a video source to the video switcher.

The clips selected on the devices currently on air.

Any devices that are used as an audio source to the audio mixer.

Video selection on program and preset video buses.

Video selection on all key buses that are part of the output.

Ability to select specific video inputs on a video bus or a virtual video input.

Number of keyers that can be used for this video output. This is not restricted to the number of keyers in an MLE but to the number of keyers in the video switcher.

Whether the audio being used for this video output is standard audio follow video or not.

If the audio is not the standard audio follow video then the user is allowed to specify any audio they want.

The user can specify the volume independently for every audio input.

Any devices that feed any of the video buses for this template.

The above with the exception of the clip information can be referred to as a shot template. Shot templates can include any or all of the above items. For example, it is possible to create shot templates including only video elements, only audio elements, only device elements or combinations thereof. Shot templates can also include transition effect controls to describe how the shot template is to be taken to air.

The user can create as many shot templates as they want. An example of a shot template can include:

Shot Template Name: Cam 1 with Video Server in Over The Shoulder Box.
Shot Template Number: 1003 (user selectable).
Background video: Cam 1.
Number of Keys: 1.
Video Source for Key 1: Video Server (Special note, this is a device).
Audio Sources in use: Mic 1 at 45%, Video Server at 45%.
Video Effect: 8 frame Dissolve.
Audio Effect: 3 frame Crossfade.

Device Templates

Devices have to be configured so that the system knows how to use them. Many devices have multiple outputs that are all considered identical for purposes of the switcher. For example, a video server may have two video outputs, wherein the video server is capable of playing any of it's files onto either outputs. For purposes of creating the on air shot, either of the outputs of the video server can be considered identical by the video switcher.

Initial Setup

When a user creates a Device Template, they can manually enter:

The name of the device they would like to use.
The number of video outputs the device has.
The type of device (e.g., Video server vs robotic camera, and the like).

Figure 1:
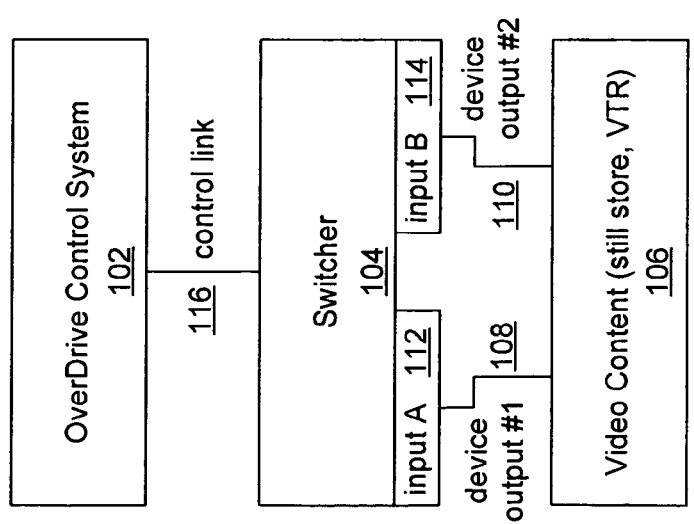
FIG. 1 illustrates an exemplary configuration of the present invention connected to a production switcher, with 2 outputs each connected to a different external device.

For each video output of the device, the user can also specify the video input connector to which it was attached on the switcher. For example, the user might have a still store device (106) with two outputs (108, 110) to the switcher (104), as illustrated in FIG. 1. When creating a shot template, the user can name the device (106), specify that it has two video outputs (108, 110), and that the outputs (108, 110) are connected to switcher (104) video inputs A (112) and B (114). In FIG. 1, the OverDrive Control System (102) controls the switcher (104) via a control link (116). For example, in the previous section, the device template was called "Video Server."

Shot Template Instances

Shot templates themselves are not taken to air. The user can create an "instance" of a shot template. A shot template instance is identical to a shot template except that it also includes device clip information.

The user can create as many shot template instances of the same shot template as they want. For example, in the previous section, the shot template was called "Cam 1 with Video Server in Over The Shoulder Box." The user can create as many shot template instances of the shot template as desired, wherein each instance can be used to specify a different video clip for the system to use.

Additionally, a shot template instance can be created where the device clip information is intentionally left blank. When this is done, the user can be prompted for the device clip information, when the shot template has been requested to go to air.

Running Video

In the present specification, preparing refers to setting all devices and elements that are going to be used in the next on-air shot ready. This can include: setting elements on the video switcher in a fashion that allows them to be previewed on an output, instructing devices to provide specified clip(s) on the device output(s) corresponding to selected video inputs on the switcher, selecting outputs on devices that will be used in conjunction with but are not connected to the production switcher, and displaying audio elements that will be used by a prepared item. When a shot template instance is prepared, if it includes video elements, these elements can be set on the video switcher in a fashion which allows them to be previewed. If required, final changes can then be made to the video elements, either through controls included within the OverDrive system or by using the controls on the video switcher itself.

When a shot template instance is taken to air, the video switcher can use the named video effect included in the shot template instance to transition the video elements. Video effects included in shot templates can describe any suitable transition effect at any suitable rate that is possible for the video switcher to perform.

Running External Devices

When a shot template instance is prepared, if it includes device elements, clips can be required. Clips are specific to the device, and a mechanism is included in the OverDrive system to ensure that the chip is valid for the device. The user can specify a device clip at various times, for example:

In advance, when creating a rundown.
When the show is being played out.
During the creation of a shot template instance.

When playing through a rundown, the OverDrive system can automatically use any suitable clips specified ahead of time. If no clip was specified, or if the clip is invalid, the user can be prompted for one.

Choosing a Free Device Output

When preparing a template to air, the OverDrive system can check which device outputs are currently in use. The OverDrive system does this by looking at the video input connections for the device, as specified in the Device Template. If the device output is used by either (i) any crosspoint of an on-air MLE or (ii) an on air internal DSK (Downstream Keyer), that output can be considered to be in use. As those skilled in the art will appreciate, a switcher has many keyers in it. Of the many keyers within a switcher, several of these will often be designated as downstream keyers. The downstream keyers are the last keyers in the video mixing chain. Video keyed using the downstream keyers will be on top of the rest of the video.

The OverDrive system can look at all of the device outputs until it finds one that is not considered to be on air. If no device outputs are found that are not considered to be on air, then the shot template need not be allowed to be taken to air. The OverDrive system is capable of analyzing shot templates and giving visual indications that a shot template can not be taken to air in advance of the user requesting the shot template.

Preparing a Clip

After a device input has been chosen, the OverDrive system can automatically prepare the clip specified earlier. The device can be instructed to provide the clip over the device output corresponding to the selected video input on the switcher.

Taking a Device to Air

When the shot template instance including a device is taken to air, the specified clip can be automatically played. For example, if a shot template instance used a video server device, a prepared clip on that video server would automatically start playing at the time the shot was taken to air.

Running Audio

When a shot template instance is prepared, if it includes audio elements, these elements can be displayed on the OverDrive system in a fashion which allows them to be previewed. If required, final changes can then be made to the audio elements through controls included within the OverDrive system.

When a shot template instance is taken to air, the audio mixer can use the named audio effect included in the shot template instance to transition the audio elements. Audio effects included in shot templates can describe any suitable effect at any suitable rate that is possible for the audio mixer to perform, including crossfades, cuts, pans, and the like.

Further Features of the OverDrive System

The exemplary embodiments offer a great amount of flexibility in supporting control of devices, which fall into exemplary classes:
  MOS devices: Newer devices, which have support for the industry-standard, MbS (Media Object Server) protocol.
  "Legacy" Devices: Older devices, which are not MOS-enabled, but which can be controlled through a variety of ad hoc, often vendor-specific protocols.
In the exemplary embodiments, such control is abstracted further, through connection to a personal computer-based system. The OverDrive system exposes a single, unified, easy to use, rich computer user interface through which both new MOS-enabled devices, and legacy non-MOS can be simultaneously used in an integrated way in the production of a television show.

The OverDrive system provides a communications bridge from Newsroom Computer System (NCS) software to legacy devices which those pieces of software may not be able to directly control. The NCS can communicate with the Over-Drive system using the MOS Protocol in the usual manner. The OverDrive system then translates the NCS's directives to the switcher's specific control language and runs both the switcher and other devices connected to it. Status and other information may then be sent back from the switcher and the other devices to the OverDrive system, where it can be communicated back to the NCS using MOS.

The OverDrive system is the first production switcher automation controller enabled for open MOS protocol use with currently available NCS products. Switcher functionality is exposed inside the NCS (e.g., including ENPS clients, INEWS clients, AutoCue clients, and the like). Thus, the following features are provided by the exemplary embodiments:
  The OverDrive system provides a two-way bridge of communication between the worlds of the NCS and the switcher hardware.
  The NCS communicates with the OverDrive system using the industry-standard MOS protocol.
  The OverDrive system associates shot templates with stories contained within the MOS rundown received from the NCS.
  The OverDrive system then invokes specific commands via an extended serial protocol on the switcher, to changes its behavior in accordance with the information received via MOS.
  Changes in device state can then be communicated back to the switcher, and are converted and retransmitted from the switcher to the OverDrive system. The OverDrive system can then use the MOS protocol to inform the newsroom software of the results of device operation.

Multiple Switcher Control Modes

The functionality of the switcher is exposed in multiple ways to maximize flexibility and allow users options in the event of hardware or software failure. The switcher can be controlled by:
  A user sitting directly at the switcher panel (for old style productions, or in an emergency if new automation functionality fails).
  A user sitting at the OverDrive system console, using a more compact, simplified, task-based PC-screen user interface to create rundowns, assemble shots, do switcher quick recalls and custom controls, control audio, etc.
  A user building a rundown in an NCS, dragging and dropping objects that are essentially instructions to the switcher to take action and change the appearance of the show into a script, with those changes picked up by the switcher later, as the show proceeds.

Dynamic Resource Allocation in Newsroom Automation System

In the course of airing a broadcast, switchers and other newsroom hardware have limited resources. The numbers of instances of such resources as MLEs, cameras, video server channels, etc., available at any given instant in a program, are thus limited. The system, during rundown creation, rearrangement and playout, can watch for conflicts in still upcoming pieces of the broadcast and either warn the user that a segment of the show has been made unable to go to air because of them, or can substitute in pre-configured fallback defaults for the faulty shot (station logo, commercial, "TECHNICAL DIFFICULTIES, DO NOT ADJUST YOUR SET", etc.) if the user fails to remedy the situation in time.

Real-Time Connection Between Rundown Editors and the Video Switcher

The exemplary embodiments provide a real-time connection between rundown editors and the production control switcher across a network. As a system including multiple networked computers, it works as an addition to an existing video production system, allowing automation of the video switcher. By providing a live-link between the switcher and the rundown editor, it is possible to make changes to rundowns and stories, change devices or clips on the fly and have a seamless communication link between production and playout.

Figure 2:
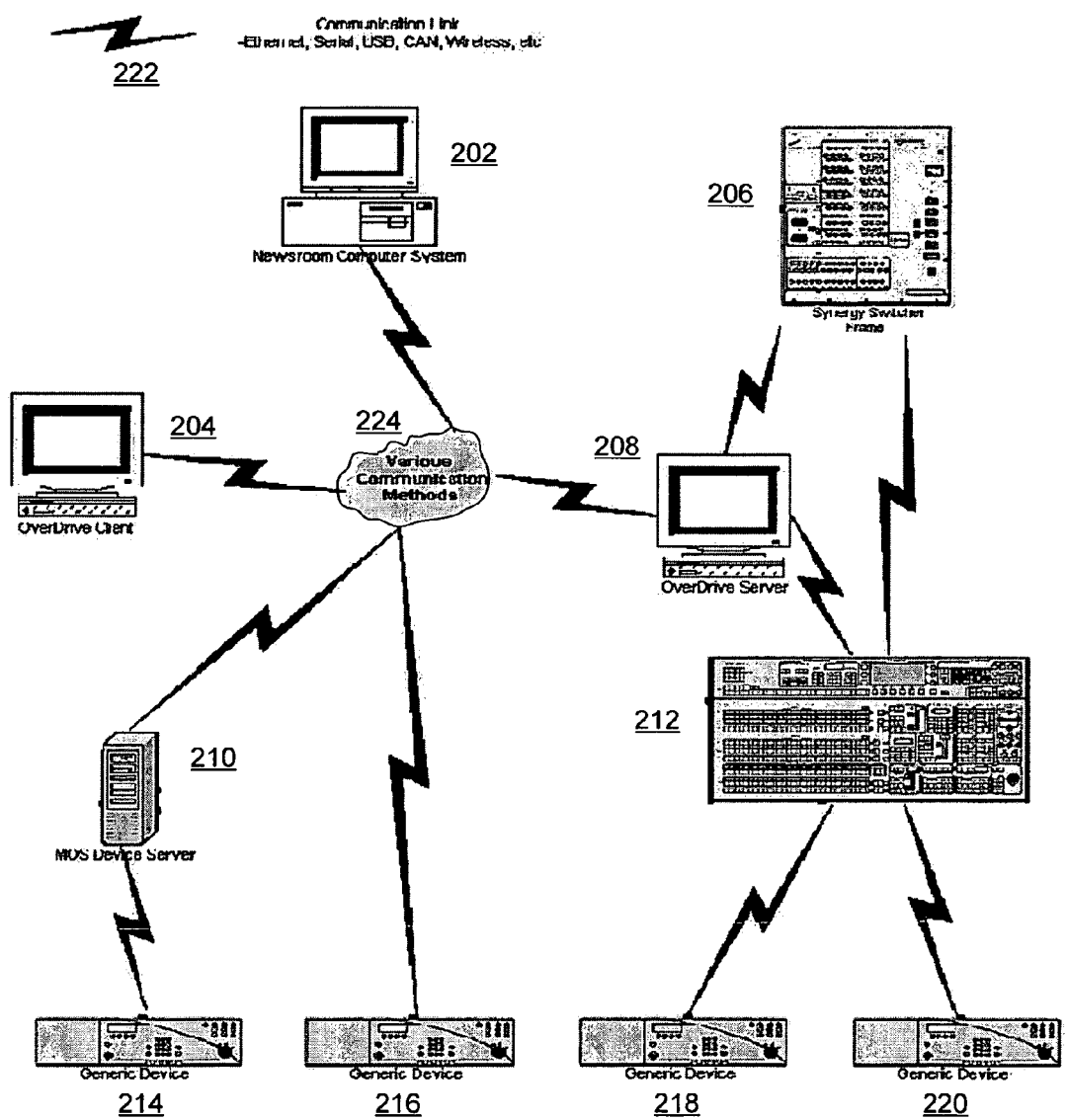
FIG. 2 illustrates an exemplary network configuration of the present invention, including networked computers running the production control software, connected to a network including devices and a production control switcher.

An exemplary embodiment, as shown in FIG. 2, can include one or more personal computers (204, 208), connected to the production switcher (206, 212) via a network link(s) (222, 224), and to one or more devices (210, 214, 216) via the same or other network links (222, 224). Devices (218, 220) to be controlled can also be connected to the production control switcher (206, 212). The devices of FIG. 2 can also be connected to a newsroom control system (202) via the same or other network links (222, 224).

A further exemplary embodiment, as shown in FIG. 3, can include one or more computers (302, 304) connected to the production switcher (308) via a serial communications cable (316). The computers (302, 304) are networked (via server 306 and communication links 312), allowing communication between the computers (302, 304), as well as a rundown editor, and the like. The computers (302, 304) offer a variety of switcher control options, including, preparing shots on the production control switcher (308) from a rundown published by a third party software, from a pre-prepared set of shots, and the like, providing direct control over switcher inputs and output mappings.

Figure 4:
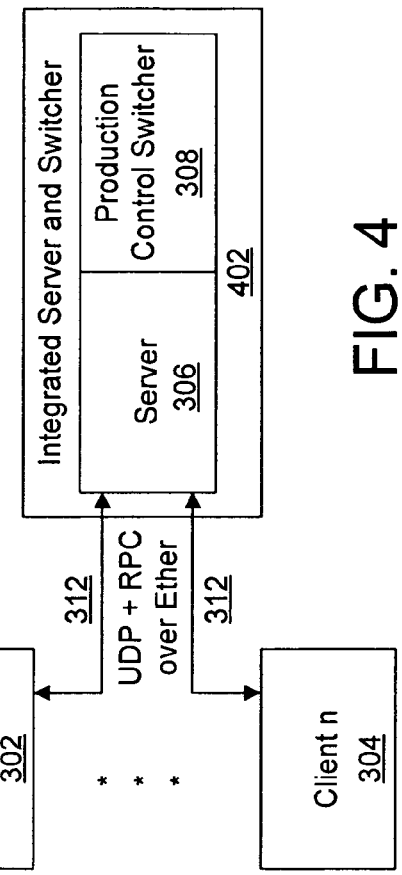
FIG. 4 illustrates a further exemplary network configuration of the present invention, including networked computers connected to the production switcher via a shared communication media.

In a further exemplary embodiment, as shown in FIG. 4, one or more computers (302, 304) are connected to the production switcher via some shared communication media (312). The computers (302, 304) are networked via an integrated server switcher (402), and can communicate with each other via the integrated server (306), with a third-party, with an included rundown editor, with the production control switcher (308), and the like. Each computer (302, 304) can receive updates from the switcher (308) about it's state, from the rundown editor(s) about rundown state, and can be added to or leave the control network independently. Each computer (302, 304) in the control network can provide instruction to the switcher (308).

Figure 5:
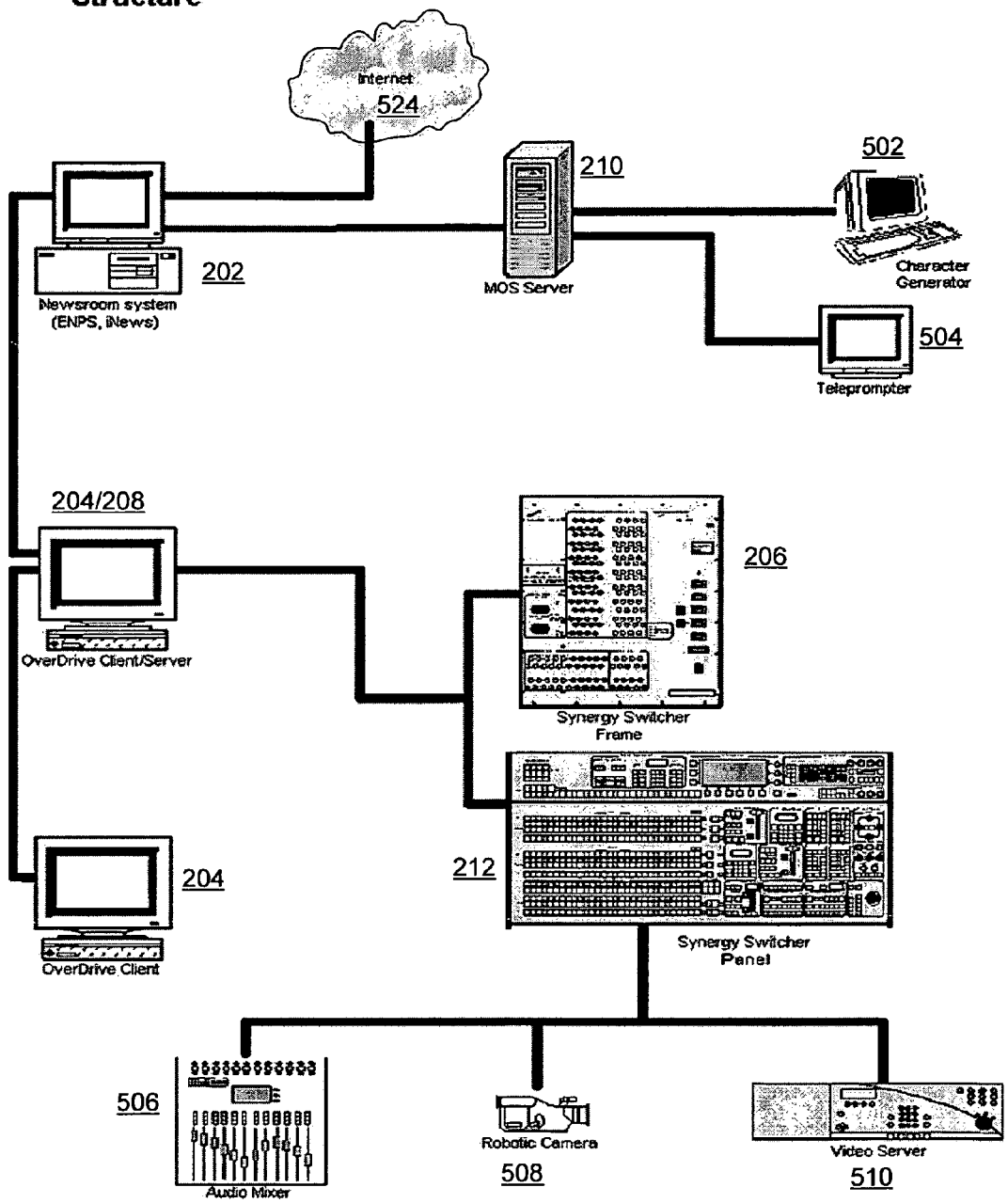
FIG. 5 illustrates an exemplary wiring configuration of the present invention within a production environment.

An exemplary configuration of the exemplary embodiments of the present invention is shown in the FIG. 5. In FIG. 5, real-time or near real-time communication between computers, the video switcher (206, 212), and the rundown editor or other external devices (506-510) in the control room, is accomplished through a combination of Ethernet and serial networks. Switcher (206, 212) control is maintained through a server (204/208), which acts as an intermediary between the Ethernet based client machines (202, 210, 502, 504), and the serial based production control switcher (206, 212). Template or "look" control is maintained through a server, which acts as a database for collecting look information. In an exemplary embodiment, a "look" can include shot templates that correspond to particular settings on the production control switcher or settings of parts of the production control switcher.

In an exemplary embodiment, switcher communication can occur over a serial link, and the like. This link runs between the production control switcher, and a control PC, also referred to as the server. The link can use commonly available serial technologies, such as RS-232, RS-422/RS-485, and the like. This link can use a standard editor protocol.

The server is responsible for translating requests from the network side into editor messages, and transmitting them to the switcher. It is also responsible for supplying notification to the network of any and all switcher status changes is as timely a fashion as possible. The server also acts as a collection point for all look information, and distributes change notification across the network when looks are added, modified or deleted.

The exemplary embodiments can be easily integrated into a control room with a minimum of disruption. The exemplary embodiments can control the equipment that is already in place without requiring extensive rewiring or the purchase of new equipment. The exemplary embodiments do this by controlling the video switcher, which is an essential element in all control rooms.

Since the OverDrive system does not have to be as robust as a video switcher, it can be implemented on a desktop computer (PC). While PCs are not known for their robustness, they are a very flexible platform that allows for a good user interface. Using a PC to host the OverDrive system allows for an easy-to-use system while still ensuring an essential level of robustness in the control room. In the event of a failure of the OverDrive system, the video switcher could be used to manually take over the running of the production with a minimum of delay. While the video switcher is also a single point of failure, video switchers have been designed to take this into account. Video switchers are therefore more reliable than PCs, have a much longer MTBF (Mean Time Before Failure), and, if need be, can reboot significantly faster than a PC (approximately one minute for a switcher, versus several minutes for a PC).

Device control via the video switcher offers several advantages over control of external devices directly from the PC running the OverDrive system. In most control rooms, the video switcher is already the central hub. It is designed to control and, especially, coordinate, in real time, the many external devices used in a production. While PCs can provide flexibility and a good user interface, real time control is not their strength. Using the video switcher to provide such external device control, provides the OverDrive system with much more effective device control than if it tried to control all the devices itself. The OverDrive system therefore only has to focus on controlling one device (e.g., the video switcher). By sending commands to the video switcher through the switcher's external control interface, the OverDrive system is effectively controlling external devices in a reliable, timely and proven manner.

Much of the device setup is done on the switcher itself. The OverDrive system uses command messages to prepare the device for the next shot. Typical commands can include (i) cue a clip on a video server, (ii) instructing a robotic camera to ready a predetermined shot, (iii) recall a still from a still store, (iv) set up a DVE transition, and the like. The OverDrive system informs the switcher of the input location to select to bring the desired device output to air. When the user requests a transition, the OverDrive system sends a command to the switcher, which then performs the transition, coordinating with all suitable external devices, as necessary.

In an exemplary embodiment, a shot template can include various pieces of information, as previously described. In each shot, any number of keyers, up to the maximum number allowed in the video system, may be chosen regardless of the physical location of the keyer within the system. (this can be MLE independent by virtualizing the keyers). The user creates instances of templates for running.

All devices that are referenced in a template need clip information for that template instance to be able to be run. A clip refers to a different item for each different device. A CG (Character Generator), for instance, is a piece of broadcast video equipment that is used to generate a pair of video signals that are graphics and/or text. A keyer is used to mix this text on top of a video signal. Examples of clips are:

| | |
|---|---|
| Character Generator: | Clip = Character Generator template with all text. |
| Robotic Cameras: | Clip = Robotic camera position. |
| Video Servers: | Clip = Video Clip to play. |
| Still Store: | Clip = Still Image to play. |
| Digital Video Effect (DVE): | Clip = Effect to play. |
| Video Tape Recorder (VTR): | Clip = Timecode on video tape to play from. |

Multiple instances of the same base template can be created. Each unique instance of the same base template can have different clip information. An instance of a template does not have to have clip information entered when the instance is created. The clip information for some or all devices can be left blank. All shot templates are constantly analyzed against what is on air by software according to the exemplary embodiments. The number of resources currently on air is compared against the number of resources in the system as a total. Shot templates that employ more resources than are currently available can be marked as impossible to the user.

When a shot template is selected to play to air it does not go directly to air but to preview. The user sees this preview in both the user interface and on a video monitor. The user can leave the template in preview for as long as they want verifying that all elements of the shot template are correct. Once the user has verified that every element on preview is correct then they can transfer it to program.

When a shot template is selected all devices that are attached to the shot template are sent their clip information.

When a shot template is selected to play to air that has any devices attached to it that have blank clip information in the template instance, the user can be prompted through the graphical user interface (GUI) for this clip information during the running of the show.

The user can create visual banks of shot template instantiations in their user interface.

The user can create a list of shot templates instantiations and store and recall these lists.

The user when producing a show can choose to load a sequential list of shot templates to play. When this list is loaded the user can simply elect to play one-shot template in the list after another or can select to play the shot templates in any order. The timing playout of this list can be automated or handled manually.

When the user is sequentially going through the shot templates from a list the user can opt to run any shot template instantiation they would like instead of the next shot template in the list.

The shot templates that are created in a computer system are duplicated in the video production switcher.

The shot templates can be run from the video production hardware's user interfaced (usually referred to the switcher panel) as well as from the computer based system.

The devices and subsystems of the exemplary embodiments described with respect to FIGS. 1-5 can communicate, for example, over a communications network, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, the communications network can include, for example, wireless communications networks, cellular communications networks, satellite communications networks, Public Switched Telephone Networks (PSTNs), Packet Data Networks (PDNs), the Internet, intranets, hybrid communications rietworks, combinations thereof, and the like.

As noted above, it is to be understood that the exemplary embodiments, for example, as described with respect to FIGS. 1-5, are for exemplary purposes, as many variations of the specific hardware and/or software used to implement the disclosed exemplary embodiments are possible. For example, the functionality of the devices and the subsystems of the exemplary embodiments can be implemented via one or more programmed computer systems or devices. To implement such variations as well as other variations, a single computer system can be programmed to perform the functions of one or more of the devices and subsystems of the exemplary systems. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, for example, to increase the robustness and performance of the exemplary embodiments described with respect to FIGS. 1-5.

The exemplary embodiments described with respect to FIGS. 1-5 can be used to store information relating to various processes described herein. This information can be stored in one or more memories, such as a hard disk, optical disk, magneto-optical disk, RAM, and the like, of the devices and sub-systems of the exemplary embodiments. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments described with respect to FIGS. 1-5 can be conveniently implemented using one or more general-purpose computer systems, microprocessors, digital signal processors, micro-controllers, and the like, programmed according to the teachings of the disclosed invention. Appropriate software can be readily prepared by programmers of ordinary skill based on the teachings of the disclosed exemplary embodiments. In addition, the exemplary embodiments can be implemented by the preparation of application-specific integrated circuits or by interconnecting an appropriate network of component circuits.

While the present invention have been described in connection with a number of exemplary embodiments and implementations, the present invention is not so limited but rather covers various modifications and equivalent arrangements, which fall within the purview of the appended claims.

What is claimed is:

1. A computerized control system, comprising:
an interface enabling communication with broadcast video and audio production devices; and
one or more computers operatively coupled to the interface and configured for controlling the broadcast video and audio production devices, the one or more computers being further configured for:
enabling one or more operators to define sequences of looks, each look being a collection of particular settings of the broadcast video and audio production devices, each sequence comprising a time sequence of a plurality of looks to be played to air sequentially;
monitoring upcoming sequences of the defined sequences of looks that have not been played to air, for production device conflicts;
providing a status indication for each upcoming sequence of looks to indicate an ability of the system to safely prepare each look within the upcoming sequence without production device conflicts, if the upcoming sequence is followed exactly when the upcoming sequence is played to air, wherein on-air output of the broadcast video and audio production devices is unaffected by the providing; and
enabling the one or more operators to prepare each look, by transmitting or causing to be transmitted, commands which modify settings of the broadcast video and audio production devices as defined by the look.

2. The system of claim 1, wherein the one or more computers are further configured for:
enabling the one or more operators to define each look; and
providing a status indication for each look to indicate an ability of the system to safely prepare the look.

3. The system of claim 2, wherein the one or more computers comprise a plurality of computers further configured for allowing a plurality of operators to co-operatively define the looks, including:
allowing the plurality of operators to work on creating or editing a multitude of the looks on separate computers of the plurality of computers that receive updates from each other automatically when an operator changes, adds or deletes an individual look; wherein the updates include information describing the ability of the system to currently prepare each look.

4. The system of claim 1, wherein the one or more computers are further configured for automatically substituting one or more pre-configured looks to replace a look that cannot be safely prepared if an operator fails to remedy the look prior to it being prepared.

5. The system of claim 1, wherein the one or more computers comprise a plurality of computers further configured for allowing a plurality of operators to co-operatively define sequences of the looks, including at least one of:
allowing the plurality of operators to work on creating or editing a particular sequence on separate computers of the plurality of computers that receive updates from each other automatically when an operator changes the sequence of looks or a definition of an individual look or a totality of created looks; and
allowing the plurality of operators to work on creating or editing a multitude of sequences on separate computers of the plurality of computers that receive updates from each other automatically when any operator changes the definition of an individual look or the totality of created looks,
wherein the updates include information describing the ability of the system to currently prepare each look within each sequence if the sequence is followed exactly.

6. The system of claim 1, wherein the one or more computers comprise a plurality of computers connected through a network and further configured for allowing one or multiple operators of a plurality of operators to transmit a look across the network, causing the look to be prepared on a video production control switcher.

7. The system of claim 1, wherein individual looks are assigned to control elements on a computer of the one or more computers, and transmitted when a control element is activated.

8. The system of claim 1, each computer of the one or more computers including a computer user interface comprising a number of control elements to which are assigned individual looks or sequences or one or more video production control switcher commands, the one or more computers being further configured for at least one of:
displaying looks using an icon attached to a control element or visual picture which represents a video output resulting from the preparation of the look;
color coding for the control elements which represent a completeness of a look, and whether or not the look can safely be prepared on a video production control switcher;
color coding for the control elements that represent sequences of looks which represent a completeness of each look included in a sequence and whether or not each look is safely preparable when the sequence is followed; and
controlling playback of a sequence, wherein an operator prepares a look in the sequence on the video production control switcher, transitions the look, and prepares a next look in the sequence using one or more of the control elements.

9. The system of claim 1, the one or more computers being further configured for enabling the one or more operators to define, create, and operationally use audio and video outputs comprised of video and audio streams, including shot templates.

10. The system of claim 1, further comprising:
a video production switcher operatively coupled to the interface and to the broadcast video and audio production devices,
the one or more computers being further configured to enable manual usage of the video production control switcher and the broadcast video and audio production devices.

11. The system of claim 1, the one or more computers being further configured for providing automated control of peripheral devices for an audio and video production system without making an automation system a single point of failure.

12. The system of claim 1 the one or more computers being further configured for enabling the one or more operators to define a video and output stream that is dependent upon a video stream built up as a combination of video elements from one or more video streams.

13. The system of claim 1, the one or more computers being further configured for enabling the one or more operators to define an output stream dependent on third party equipment, including defining the third party equipment in a virtual system without employing a physical mapping.

14. The system of claim 1, the one or more computers being further configured for enabling the one or more operators to use shot templates during a production on an as needed basis mode or in an operator defined sequential order mode with the ability to mix the two modes.

15. The system of claim 1, wherein the audio production devices are configured for processing audio, including running audio using an on air and preview paradigm and displaying both on air and prepared audio fader settings.

16. The system of claim 1, the one or more computers being further configured for allowing for control of MOS (Media Object Server)-protocol enabled devices, and allowing for control of older or legacy non-MOS devices.

17. The system of claim 1, the one or more computers being further configured for providing a communications bridge that takes at one end MOS (Media Object Server)-protocol messages and commands from an NCS (Newsroom Computer System), including at least one of:
   taking direct action based on some of the MOS-protocol messages and the commands from the NCS system;
   commanding a switcher to perform specific tasks based on other of the MOS-protocol messages and the commands from the NCS system; and
   translating the MOS-protocol messages and the commands from the NCS system into a form that is consumed by legacy, non-MOS devices, whereby the legacy, non-MOS devices participate in a modern, MOS-enabled, studio environment.

18. The system of claim 17, the one or more computers being further configured for providing a communications bridge configured for receiving status and other information from the legacy, non-MOS devices, and translating the status and the other information into MOS messages before passing the status and the other information back to the NCS.

19. The system of claim 1, the one or more computers being further configured for controlling a production switcher, including using a MOS (Media Object Server)-protocol with an NCS (Newsroom Computer System) of a vendor.

20. The system of claim 1, the one or more computers being further configured for controlling a video production control switcher, including integrating the video production control switcher with an NCS (Newsroom Computer System) of a vendor.

21. The system of claim 1, the one or more computers being further configured for exposing, to an NCS (Newsroom Computer System) operator putting together a show, functionality of broadcast devices connected downstream through a video production control switcher or the system.

22. The system of claim 1, the one or more computers being further configured for allowing features to be used during production of a script, wherein different switcher configurations and operations produce a look of a broadcast at a moment in a script and are assembled using a component that integrates into NCS (Newsroom Computer System) software.

23. The system of claim 1, the one or more computers being further configured for allowing smooth failover in an event of failures of NCS (Newsroom Computer System) hardware or software or a network environment thereof.

24. The system of claim 1, the one or more computers being further configured for allowing an operator to take control of a video production control switcher at one of a PC-based user interface of a computer console, and a physical console of the video production control switcher.

25. The system of claim 1, the one or more computers being further configured for continuous updated tracking of a condition, status, and availability of production devices in a television studio, including cameras, audio boards, switchers, video servers, and CGs (Character Generators).

26. The system of claim 1, the one or more computers being further configured for automated monitoring of resource availability as device settings of the broadcast video and audio production devices change throughout a broadcast.

27. The system of claim 1, the one or more computers being further configured for analyzing of status information associated with the broadcast video and audio production devices; and
   providing a computerized plan for a partially or fully automated program rundown to detect in advance resource conflicts where the broadcast video and audio production devices or features thereof are not currently simultaneously usable.

28. The system of claim 27, the one or more computers being further configured for warning an operator that the conflicts are going to occur.

29. The system of claim 27, the one or more computers being further configured for providing a PC-based user interface allowing the conflicts to be resolved and avoided.

30. A computerized control method, comprising:
   enabling one or more operators to define sequences of looks, each look being a collection of particular settings of broadcast video and audio production devices, using one or more computers configured for controlling the broadcast video and audio production devices, each sequence comprising a time sequence of a plurality of looks to be played to air sequentially;
   monitoring upcoming sequences of the defined sequences of looks that have not been played to air, for production device conflicts;
   the one or more computers providing a status indication for each upcoming sequence of looks to indicate an ability to safely prepare each look within the upcoming sequence without production device conflicts, if the upcoming sequence is followed exactly when the upcoming sequence is played to air, wherein on-air output of the broadcast video and audio production devices is unaffected by the providing; and
   enabling the one or more operators to prepare each look, by transmitting or causing to be transmitted from the one or more computers, commands which modify settings of the broadcast video and audio production devices as defined by the look.

31. The method of claim 30, further comprising:
   enabling the one or more operators to define each look; and
   the one or more computers providing a status indication for each look to indicate an ability to safely prepare the look.

32. The method of claim 31, wherein the one or more computers comprise a plurality of computers, the method further comprising allowing a plurality of operators to co-operatively define the looks, including:
   allowing the plurality of operators to work on creating or editing a multitude of the looks on separate computers of the plurality of computers that receive updates from each other automatically when an operator changes, adds or deletes an individual look; wherein the updates include information describing the ability to safely prepare each look.

33. The method of claim 30, further comprising:
   the one or more computers automatically substituting one or more pre-configured looks to replace a look that cannot be safely prepared if an operator fails to remedy the look prior to it being prepared.

34. The method of claim 30, wherein the one or more computers comprise a plurality of computers, the method further comprising allowing a plurality of operators to cooperatively define sequences of the looks, including at least one of:

allowing the plurality of operators to work on creating or editing a particular sequence on separate computers of the plurality of computers that receive updates from each other automatically when an operator changes the sequence of looks or a definition of an individual look or a totality of created looks; and allowing the plurality of operators to work on creating or editing a multitude of sequences on separate computers of the plurality of computers that receive updates from each other automatically when any operator changes the definition of an individual look or the totality of created looks, wherein the updates include information describing the ability to currently prepare each look within each sequence if the sequence is followed exactly.

35. The method of claim 30, wherein the one or more computers comprise a plurality of computers connected through a network, the method further comprising allowing one or multiple operators of a plurality of operators to transmit a look across the network, causing the look to be prepared on a video production control switcher.

36. The method of claim 30, further comprising:

assigning individual looks to control elements on a computer of the one or more computers; and transmitting the assigned looks when a control element is activated.

37. The method of claim 30, further comprising providing at each computer of the one or more computers a computer user interface including a number of control elements to which are assigned individual looks or sequences or one or more production control switcher commands, and at least one of:

displaying looks using an icon attached to a control element or visual picture which represents a video output resulting from the preparation of the look;

color coding for the control elements which represent a completeness of a look, and whether or not the look can safely be prepared on a video production control switcher;

color coding for the control elements that represent sequences of looks which represent a completeness of each look included in a sequence and whether or not each look is safely preparable when the sequence is followed; and controlling playback of a sequence, wherein an operator prepares a look in the sequence on the video production control switcher, transition the look, and prepare a next look in the sequence using one or more of the control elements.

38. The method of claim 30, further comprising enabling the one or more operators to define, create, and operationally use audio and video outputs comprised of video and audio streams, including shot templates.

39. The method of claim 30, further comprising enabling manual usage of a video production control switcher that is operatively coupled to the one or more computers and to the broadcast video and audio production devices, and enabling manual usage of the broadcast video and audio production devices.

40. The method of claim 30, further comprising providing automated control of peripheral devices for an audio and video production system without making an automation system a single point of failure.

41. The method of claim 30, further comprising using shot templates in both a video production system and a desktop PC computer based system, including running the shot templates using either the video production system or the desktop PC, and using both the video production system and the desktop PC during a video production.

42. The method of claim 30, further comprising enabling the one or more operators to define a video and output stream that is dependent upon a video stream built up as a combination of video elements from one or more video streams.

43. The method of claim 30, further comprising enabling the one or more operators to define an output stream dependent on third party equipment, including defining the third party equipment in a virtual system without employing a physical mapping.

44. The method of claim 30, further comprising enabling the one or more operators to use shot templates during a production on an as needed basis mode or in an operator defined sequential order mode with the ability to mix the two modes.

45. The method of claim 30, further comprising processing audio, including running audio using an on air and preview paradigm and displaying both on air and prepared audio fader settings.

46. The method of claim 30, further comprising allowing for control of MOS (Media Object Server)-protocol enabled devices, and allowing for control of older or legacy non-MOS devices.

47. The method of claim 30, further comprising providing a communications bridge that takes at one end MOS (Media Object Server)-protocol messages and commands from an NCS (Newsroom Computer System), including at least one of:

taking direct action based on some of the MOS-protocol messages and the commands from the NCS system;

commanding a switcher to perform specific tasks based on other of the MOS-protocol messages and the commands from the NCS system; and translating the MOS-protocol messages and the commands from the NCS system into a form that is consumed by legacy, non-MOS devices, whereby the legacy, non-MOS devices participate in a modern, MOS-enabled, studio environment.

48. The method of claim 47, further comprising providing a communications bridge configured for receiving status and other information from the legacy, non-MOS devices, and translating the status and the other information into MOS messages before passing the status and the other information back to the NCS.

49. The method of claim 30, further comprising controlling a production switcher, including using a MOS (Media Object Server)-protocol with an NCS (Newsroom Computer System) of a vendor.

50. The method of claim 30, further comprising controlling a video production control switcher, including integrating the video production control switcher with an NCS (Newsroom Computer System) of a vendor.

51. The method of claim 30, further comprising exposing, to an NCS (Newsroom Computer System) operator putting together a show, functionality of broadcast devices connected downstream through a video production control switcher.

52. The method of claim 30, further comprising allowing features to be used during production of a script, wherein different switcher configurations and operations produce a look of a broadcast at a moment in a script and are assembled using a component that integrates into NCS (Newsroom Computer System) software.

53. The method of claim 30, further comprising allowing smooth failover in an event of failures of NCS (Newsroom Computer System) hardware or software or a network environment thereof.

54. The method of claim 30, further comprising allowing an operator to take control of a video production control switcher at one of a PC-based user interface of a computer console, and a physical console of the video production control switcher.

55. The method of claim 30, further comprising continuous updated tracking of a condition, status, and availability of production devices in a television studio, including cameras, audio boards, switchers, video servers, and CGs (Character Generators).

56. The method of claim 30, further comprising automated monitoring of resource availability as device settings of the broadcast video and audio production devices change throughout a broadcast.

57. The method of claim 30, further comprising:
analyzing of status information associated with the broadcast video and audio production devices; and
providing a computerized plan for a partially or fully automated program rundown to detect in advance resource conflicts where the broadcast video and audio production devices or features thereof are not currently simultaneously usable.

58. The method of claim 57, further comprising warning an operator that the conflicts are going to occur.

59. The method of claim 57, further comprising providing a PC-based user interface allowing the conflicts to be resolved and avoided.

60. The method of claim 30, wherein the method is implemented with a computer readable medium including computer readable instructions embedded therein and configured to cause one or more computer processors to perform the method.

61. One or more non-transitory computer readable media including computer readable instructions embedded therein for audio and video production in conjunction with broadcast video and audio production devices and one or more computers configured for controlling the broadcast video and audio production devices, the computer readable instructions configured to cause computer processors to perform a method comprising the steps of:
enabling one or more operators to define sequences of looks using the one or more computers, each look being a collection of particular settings of the broadcast video and audio production devices, each sequence comprising a time sequence of a plurality of looks to be played to air sequentially;
monitoring coming sequences of the defined sequences of looks that have not been played to air, for production device conflicts;
providing a status indication for each upcoming sequence of looks to indicate an ability to safely prepare each look within the upcoming sequence without production device conflicts, if the upcoming sequence is followed exactly when the upcoming sequence is played to air, wherein on-air output of the broadcast video and audio production devices is unaffected by the providing; and
preparing each look, by transmitting or causing to be transmitted from the one or more computers, commands which modify settings of the broadcast video and audio production devices as defined by the look.

62. The non-transitory computer readable media of claim 61, further comprising computer readable instructions configured to cause the computer processors to perform the step of:
enabling the one or more operators to define each look; and
providing a status indication for each look to indicate an ability to safely prepare the look.

63. The non-transitory computer readable media of claim 62, wherein the one or more computers comprise a plurality of computers, the media further comprising computer readable instructions configured to cause the computer processors to perform the steps of allowing a plurality of operators to co-operatively define the looks, including:
allowing the plurality of operators to work on creating or editing a multitude of the looks on separate computers of the plurality of computers that receive updates from each other automatically when an operator changes, adds or deletes an individual look; wherein the updates include information describing the ability to currently prepare each look.

64. The non-transitory computer readable media of claim 61, further comprising computer readable instructions configured to cause the computer processors to perform the step of:
automatically substituting one or more pre-configured looks to replace a look that cannot be safely prepared if an operator fails to remedy the look prior to it being prepared.

65. The non-transitory computer readable media of claim 61, wherein the one or more computers comprise a plurality of computers, the media further comprising computer readable instructions configured to cause the computer processors to perform the steps of allowing a plurality of operators to co-operatively define sequences of the looks, including at least one of:
allowing the plurality of operators to work on creating or editing a particular sequence on separate computers of the plurality of computers that receive updates from each other automatically when an operator changes the sequence of looks or a definition of an individual look or a totality of created looks; and
allowing the plurality of operators to work on creating or editing a multitude of sequences on separate computers of the plurality of computers that receive updates from each other automatically when any operator changes the definition of an individual look or the totality of created looks,
wherein the updates include information describing the ability to currently prepare each look within each sequence if the sequence is followed exactly.

66. The non-transitory computer readable media of claim 61, wherein the one or more computers comprise a plurality of computers connected through a network, the media further comprising computer readable instructions configured to cause the computer processors to perform the step of allowing one or multiple operators of a plurality of operators to transmit a look across the network, causing the look to be prepared on a video production control switcher.

67. The non-transitory computer readable media of claim 61, further comprising computer readable instructions configured to cause the computer processors to perform the steps of:
assigning individual looks to control elements on a computer of the one or more computers; and transmitting the assigned looks when a control element is activated.

68. The non-transitory computer readable media of claim 62, further comprising computer readable instructions configured to cause the computer processors to perform the steps of providing at each computer of the one or more computers a computer user interface including a number of control elements to which are assigned individual looks or sequences or one or more production control switcher commands, and at least one of:
   displaying looks using an icon attached to a control element or visual picture which represents a video output resulting from the preparation of the look;
   color coding for the control elements which represent a completeness of a look, and whether or not the look can safely be prepared on a video production control switcher;
   color coding for the control elements that represent sequences of looks which represent a completeness of each look included in a sequence and whether or not each look is safely preparable when the sequence is followed; and
   controlling playback of a sequence, wherein a operator prepares a look in the sequence on the video production control switcher, transition the look, and prepare a next look in the sequence using one or more of the control elements.

69. The non-transitory computer readable media of claim 61, further comprising computer readable instructions configured to cause the computer processors to perform the step of enabling the one or more operators to define, create, and operationally use audio and video outputs comprised of video and audio streams, including shot templates.

70. The non-transitory computer readable media of claim 61, further comprising computer readable instructions configured to cause the computer processors to perform the steps of enabling manual usage of a video production control switcher that is operatively coupled to the one or more computers and to the broadcast video and audio production devices and enabling manual usage of the broadcast video and audio production devices.

71. The non-transitory computer readable media of claim 61, further comprising computer readable instructions configured to cause the computer processors to perform the step of providing automated control of peripheral devices for an audio and video production system without making an automation system a single point of failure.

72. The non-transitory computer readable media of claim 61, further comprising computer readable instructions configured to cause the computer processors to perform the steps of using shot templates in both a video production system and a desktop PC computer based system, including running the shot templates using either the video production system or the desktop PC, and using both the video production system and the desktop PC during a video production.

73. The non-transitory computer readable media of claim 61, further comprising computer readable instructions configured to cause the computer processors to perform the step of enabling the one or more operators to define a video and output stream that is dependent upon a video stream built up as a combination of video elements from one or more video streams.

74. The non-transitory computer readable media of claim 61, further comprising computer readable instructions configured to cause the computer processors to perform the steps of enabling the one or more operators to define an output stream dependent on third party equipment, including defining the third party equipment in a virtual system without employing a physical mapping.

75. The non-transitory computer readable media of claim 61, further comprising computer readable instructions configured to cause the computer processors to perform the step of enabling the one or more operators to use shot templates during a production on an as needed basis mode or in an operator defined sequential order mode with the ability to mix the two modes.

76. The non-transitory computer readable media of claim 61, further comprising computer readable instructions configured to cause the computer processors to perform the steps of processing audio, including running audio using an on air and preview paradigm and displaying both on air and prepared audio fader settings.

77. The non-transitory computer readable media of claim 61, further comprising computer readable instructions configured to cause the computer processors to perform the steps of allowing for control of MOS (Media Object Server)-protocol enabled devices, and allowing for control of older or legacy non-MOS devices.

78. The non-transitory computer readable media of claim 61, further comprising computer readable instructions configured to cause the computer processors to perform the steps of providing a communications bridge that takes at one end MOS (Media Object Server)-protocol messages and commands from an NCS (Newsroom Computer System), including at least one of:
   taking direct action based on some of the MOS-protocol messages and the commands from the NCS system;
   commanding a switcher to perform specific tasks based on other of the MOS-protocol messages and the commands from the NCS system; and
   translating the MOS-protocol messages and the commands from the NCS system into a form that is consumed by legacy, non-MOS devices, whereby the legacy, non-MOS devices participate in a modern, MOS-enabled, studio environment.

79. The non-transitory computer readable media of claim 78, further comprising computer readable instructions configured to cause the computer processors to perform the steps of providing a communications bridge configured for receiving status and other information from the legacy, non-MOS devices, and translating the status and the other information into MOS messages before passing the status and the other information back to the NCS.

80. The non-transitory computer readable media of claim 61, further comprising computer readable instructions configured to cause the computer processors to perform the steps of controlling a production switcher, including using a MOS (Media Object Server)-protocol with an NCS (Newsroom Computer System) of a vendor.

81. The non-transitory computer readable media of claim 61, further comprising computer readable instructions configured to cause the computer processors to perform the steps of controlling a video production switcher, including integrating the video production control switcher with an NCS (Newsroom Computer System) of a vendor.

82. The non-transitory computer readable media of claim 61, further comprising computer readable instructions configured to cause the computer processors to perform the step of exposing, to an NCS (Newsroom Computer System) operator putting together a show, functionality of broadcast devices connected downstream through a video production control switcher.

83. The non-transitory computer readable media of claim 61, further comprising computer readable instructions configured to cause the computer processors to perform the step of allowing features to be used during production of a script, wherein different switcher configurations and operations produce a look of a broadcast at a moment in a script and are assembled using a component that integrates into NCS (Newsroom Computer System) software.

84. The non-transitory computer readable media of claim 61, further comprising computer readable instructions configured to cause the computer processors to perform the step of allowing smooth failover in an event of failures of NCS (Newsroom Computer System) hardware or software or a network environment thereof.

85. The non-transitory computer readable media of claim 61, further comprising computer readable instructions configured to cause the computer processors to perform the step of allowing a operator to take control of a video production control switcher at one of a PC-based user interface of a computer console, and a physical console of the video production control switcher.

86. The non-transitory computer readable media of claim 61, further comprising computer readable instructions configured to cause the computer processors to perform the step of continuous updated tracking of a condition, status, and availability of production devices in a television studio, including cameras, audio boards, switchers, video servers, and CGs (Character Generators).

87. The non-transitory computer readable media of claim 61, further comprising computer readable instructions configured to cause the computer processors to perform the step of automated monitoring of resource availability as device settings of the broadcast video and audio production devices change throughout a broadcast.

88. The non-transitory computer readable media of claim 61, further comprising computer readable instructions configured to cause the computer processors to perform the steps of:
    analyzing of status information associated with the broadcast video and audio production devices; and
    providing a computerized plan for a partially or fully automated program rundown to detect in advance resource conflicts where the broadcast video and audio production devices or features thereof are not currently simultaneously usable.

89. The non-transitory computer readable media of claim 88, further comprising computer readable instructions configured to cause the computer processors to perform the step of warning an operator that the conflicts are going to occur.

90. The non-transitory computer readable media of claim 88, further comprising computer readable instructions configured to cause the computer processors to perform the step of providing a PC-based user interface allowing the conflicts to be resolved and avoided.

* * * * *